Aug. 30, 1949.  W. BEGEROW  2,480,281
GANG TORCH CONTROL
Filed March 22, 1946  2 Sheets-Sheet 1
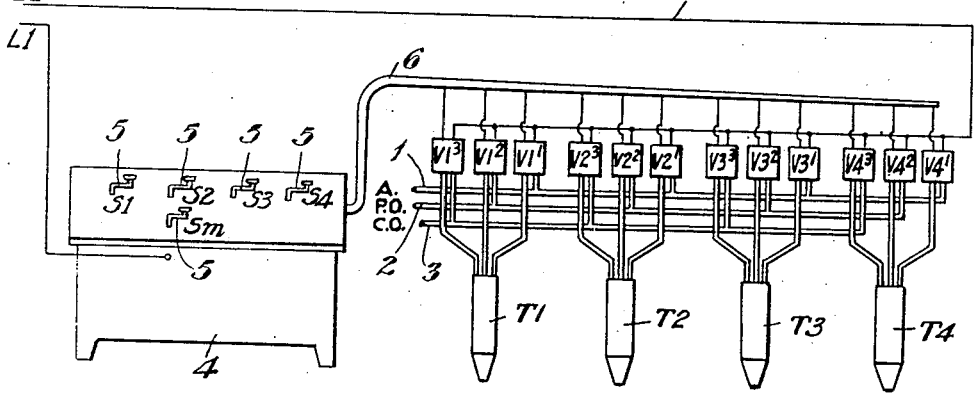
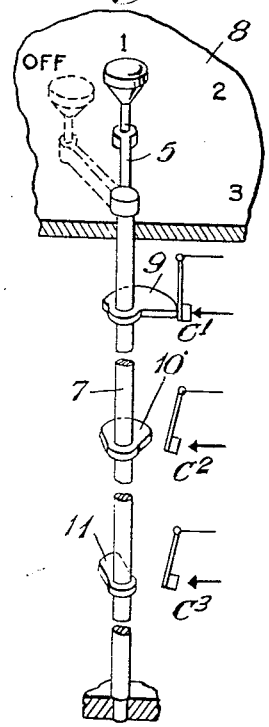
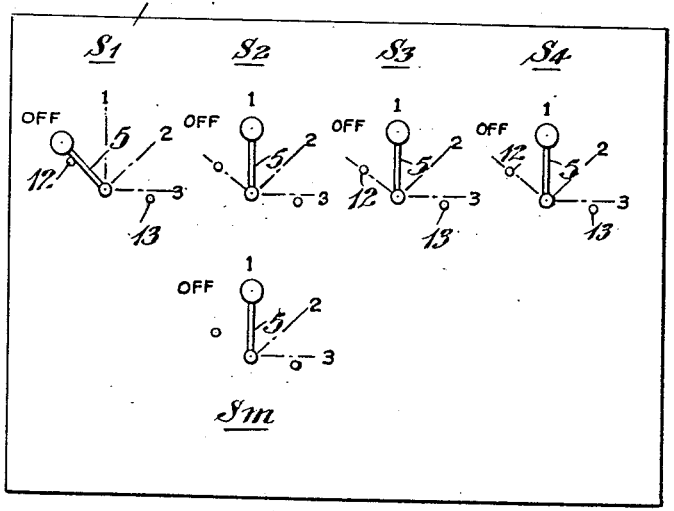
INVENTOR
WALTER BEGEROW
BY
ATTORNEYS

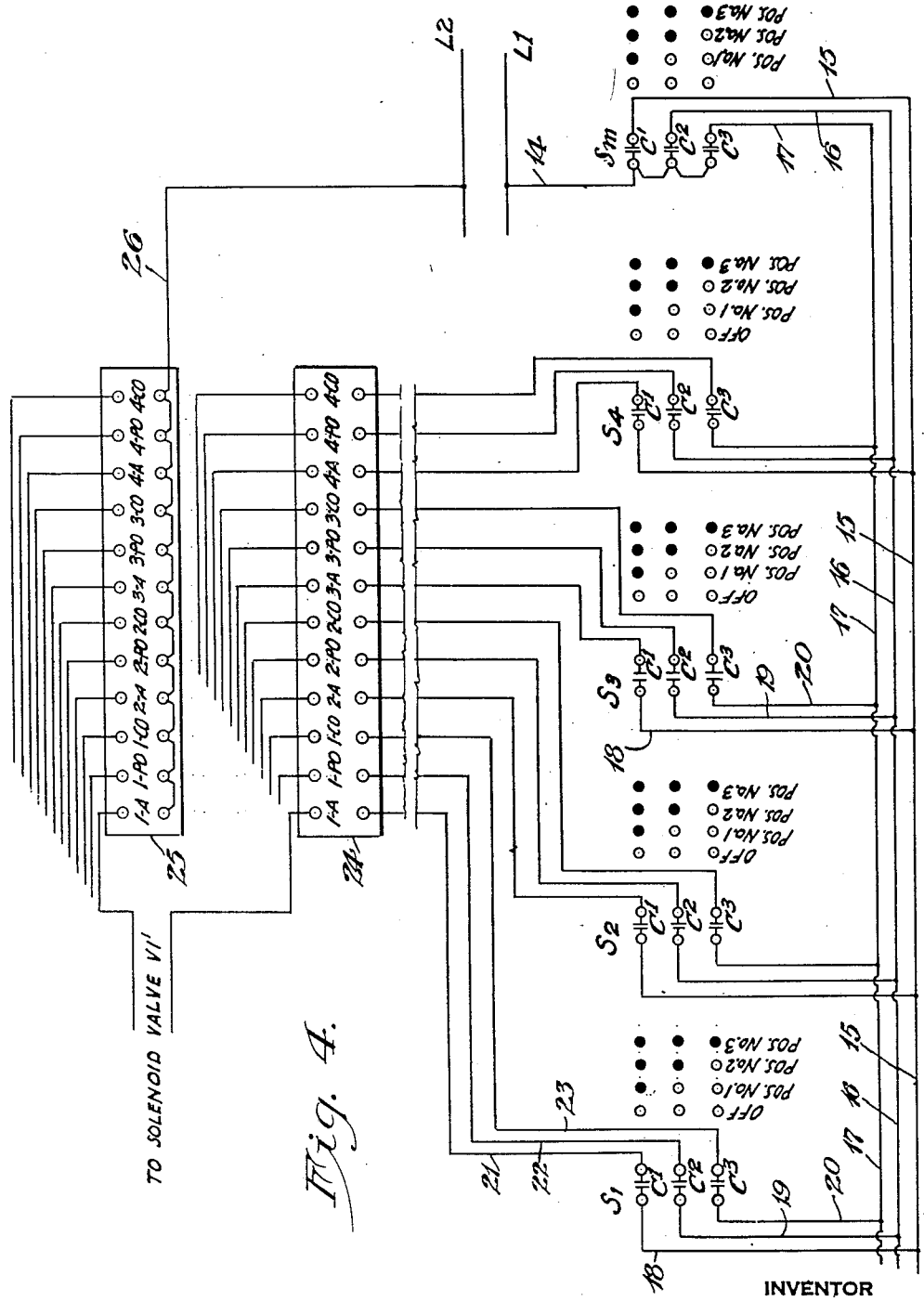

UNITED STATES PATENT OFFICE 2,480,281

GANG TORCH CONTROL

Walter Begerow, Wood-Ridge, N. J., assignor to Air Reduction Company, Incorporated, a corporation of New York Application March 22, 1946, Serial No. 656,230

5 Claims. (Cl. 158—27.4)

This invention relates to apparatus for controlling the supply of gases to a gang of gas torches.

The principal object of the invention is to provide a remote control system for the gases supplied to a gang of torches which makes it possible for the operator, by manipulating control switches at a control station, to control the gas supply to the torches individually or collectively and to turn on the different gases in a predetermined sequence either to any single torch or to all or any selected group of the torches simultaneously.

According to the invention the supply of the different gases to each torch is controlled by several electro-magnetically actuated valves, such as solenoid valves, which are electrically connected to a corresponding torch control switch at the control station, so that there are as many torch control switches as there are torches in the gang. There is also a main control switch at the control station which is so connected electrically with the torch control switches and with the solenoid valves that by manipulating the switches in the manner hereinafter described the operator can either cause operation of the solenoid valves of a particular torch in predetermined sequence and thereby turn on the gases to any desired torch in the proper order, or he can cause operation in a predetermined sequence of the sets of corresponding solenoid valves of all or any selected group of the torches and thereby turn on the gases in proper order to all of the selected torches simultaneously. If the torches are welding or heating torches the gases supplied to them may be fuel-gas and oxygen and should preferably be turned on in the order named. If the torches are cutting torches the gases may be fuel-gas, preheating oxygen and cutting oxygen. In this case the fuel-gas and oxygen, preferably in the order named, should first be turned on for the preheating flames, and then at the end of the usual work-preheating period the cutting oxygen should be turned on.

A gas supply system embodying the invention is illustrated in the accompanying drawings, in which:

Figure 1 is a diagrammatic representation of a gang of gas torches and the improved gas control system for them;

Fig. 2 is a vertical section through one of the control switches;

Fig. 3 is a plan view of the panel of the cabinet at the control station which houses the control switches; and Fig. 4 is a circuit diagram showing the electrical connections between the various switches and the solenoid valves.

Referring first to Fig. 1, four gas torches are represented at T1, T2, T3 and T4. In the particular system illustrated the torches are cutting torches, each being supplied with fuel-gas, such as acetylene, from a supply line 1, with preheating oxygen from a supply line 2, and with cutting oxygen from a supply line 3. Associated with each torch there are three electro-magnetically actuated gas valves, such as solenoid valves. The solenoid valves for the torch T1 are designated $V1^1$, $V1^2$ and $V1^3$. Those for torch T2 are designated $V2^1$, $V2^2$ and $V2^3$, and so on. As shown, the solenoid valve $V1^1$ controls the supply of fuel-gas from the supply line 1 to the torch T1, the solenoid valve $V1^2$ controls the supply of preheating oxygen from the supply line 2 to the torch T1, and the solenoid valve $V1^3$ controls the supply of cutting oxygen from the supply line 3 to the torch T1. Similarly, the valves $V2^1$, $V2^2$ and $V2^3$ associated with torch T2 control the supply of fuel-gas, preheating oxygen, and cutting-oxygen, respectively, to this torch, and so on. There may be any desired number of torches in the gang and they may be mounted in any suitable way depending upon the work to be performed. For instance, they may all be mounted on a torch-supporting bar which is moved by any suitable mechanism to cause the torches to cut around transversely at a number of different points depending upon which torches are selected from the control station to do the cutting. The solenoid valves of the torches are electrically connected to switches at a remote control station at any desired location. The mechanism of the switches is housed within a cabinet 4 at the control station. Only the actuating handles 5 of the switches appear in Fig. 1, but it will be seen that there are four torch-control switches designated S1, S2, S3 and S4 for the solenoid valves of the four torches, and an additional main control switch Sm. The contacts of the switches are electrically connected with the solenoid valves of the torches by conductors in a cable 6 leading from the cabinet at the control station to the place where the torches and solenoid valves are located.

One of the control switches is shown at Fig. 2. It comprises several pairs of contacts, the number of pairs depending upon the number of solenoid valves for each torch. Since there are three solenoid valves for each torch in the particular system illustrated there are three pairs of contacts associated with each switch, the pairs of contacts being designated $C^1$, $C^2$ and $C^3$. The contacts are actuated in any suitable manner to open and close them in the desired sequence. The means for actuating them may comprise a vertical cam shaft 7 which extends through the top panel 8 of the cabinet 4 where it is connected with the above-mentioned actuating handle 5. The cam shaft carries three cams 9, 10 and 11 which are so shaped that when the handle 5 is in the dotted line position shown in Fig. 2, i. e. the "off" position of the switch, all of the contacts are open. As the handle 5 is turned in a clockwise direction as viewed in Fig. 2 from the "off" position to position No. 1, cam 9 closes the first pair of contacts $C^1$. When the handle is turned to position No. 2, the cam 10 closes the second pair of contacts $C^2$ and the contacts of the first pair remain closed. Similarly, when the handle is turned to the third position the cam 11 closes the third pair of contacts $C^3$ and the contacts of the first two pairs remain closed. When the handle is returned to the "off" position all of the contacts are reopened. Fig. 3 is a plan view of the top panel of the switch cabinet showing all five handles of the control switches. As shown in this figure there is associated with each switch handle a stop 12 which limits the rotation of the switch handle in a counterclockwise direction, and a stop 13 which limits its rotation in a clockwise direction. When the switch handle is against the stop 12 the switch is in the "off" position, and when it is against the stop 13 it is in position No. 3.

Referring now to the wiring diagram shown in Fig. 4, the main switch $Sm$ is connected to one side L1 of a power line, or other current source, by connecting one contact of each pair of its contacts with the current source by means of a conductor 14. For instance, the three lefthand contacts of the three pairs of contacts shown in Fig. 4 may all be electrically connected to the current source by the conductor 14. A conductor 15 leads from the second contact of the first pair of contacts $C^1$, a second conductor 16 leads from the second contact of the second pair of contacts $C^2$, and a third conductor 17 leads from the second contact of the third pair of contacts $C^3$. At each torch control switch, one contact of the first pair of contacts $C^1$ is electrically connected by means of a conductor 18 to the conductor 15. Similarly, at each torch control switch one contact of the second pair of contacts $C^2$ is connected by means of a conductor 19 to the conductor 16, and one contact of the third pair of contacts $C^3$ is connected by means of a conductor 20 to the conductor 17. The other three contacts of each torch control switch are connected to conductors 21, 22 and 23, respectively, and the entire set of these conductors (constituting the cable 6 in Fig. 1) lead to a terminal board 24 located at some convenient position close to the solenoid valves of the torches. There is also a second terminal board 25 at this location. The coil of the solenoid valve $V1^1$, which controls the supply of acetylene or other fuel-gas to the torch T1, is connected across the first two terminals on the terminal boards designated 1—A, meaning acetylene for the first torch. The coil of the solenoid valve $V1^2$, which controls the supply of preheating oxygen to the torch T1, is connected across the second pair of contacts on the terminal boards designated 1—PO, meaning preheating oxygen for the first torch, and the coil of the solenoid valve $V1^3$, which controls the supply of cutting oxygen to the torch T1, is connected across the third pair of terminals on the terminal boards designated 1—CO, meaning cutting oxygen for the first torch. Similarly, the coil of the solenoid valve $V2^1$, which controls the supply of acetylene or other fuel-gas to the torch T2, is connected across the fourth pair of terminals on the terminal boards designated 2—A, and so on. All of the return conductors from the solenoid valves are electrically connected to a common conductor 26 which is connected to the other side L2 of the power line or other current source.

It will be seen from the circuit diagram of Fig. 4 that the three pairs of contacts of each torch control switch are connected in series with the three solenoid valves of the corresponding torch, and that the circuits which include the contacts of the torch control switches and the solenoid valves are connected in parallel relation across one side L2 of the power line on the one hand, and the three conductors 15, 16 and 17 leading from the contacts of the main control switch on the other hand.

The explanatory charts beside the switch contacts in Fig. 4 are simply to make it clear that in the "off" position of each switch the three pairs of contacts are open; in the No. 1 position of each switch the first pair of contacts, i. e. the uppermost ones in Fig. 4, are closed; in position No. 2 the first and second pairs of contacts are closed; and in position No. 3 all three pairs of contacts are closed.

The operation of the control system is as follows: If it is desired to use only one of the torches, say the torch T1, the handle of the main control switch is moved to No. 3 position to close all three pairs of contacts of this switch. The handle of the torch control switch S1 is then rotated through its successive positions, thereby first closing the pair of contacts $C^1$, and this results in energization of the solenoid valve $V1^1$ to turn on the supply of acetylene or other fuel-gas to the torch T1; then closing the second pair of contacts $C^2$, resulting in energization of the solenoid valve $V1^2$, which thereby turns on the supply of preheating oxygen to the torch T1; and finally closing the third pair of contacts $C^3$, resulting in energization of the solenoid valve $V1^3$, which turns on the supply of cutting oxygen to the torch T1. It is assumed in the system illustrated that the torches are employed for cutting a hot work-piece and that the fuel-gas would be ignited at the torch tip by the hot work when the fuel-gas is turned on. If cold work is being cut by the torches then pilot flames may be employed for igniting the fuel-gas in accordance with conventional practice. Similarly, the gases may be turned on in proper sequence at any desired torch in the gang by turning the handle of the corresponding torch control switch at the control station. All of the torches, or any desired number of them, may of course be put in operation in succession by turning the handles of their corresponding torch control valves successively. An alternative way of turning on the gases to a single torch at a time is to turn the handle of the torch control switch for the selected torch to its No. 3 position to thereby close all of the contacts of this switch and then turn the handle of the main control switch from its "off" position through its other successive positions, thereby energizing the solenoid valves of the selected torch in the same sequence as above described.

When it is desired to turn on the gases to all of the torches simultaneously, the handles of all of the torch control switches are moved to the No. 3 position to thereby close all of the contacts of all of the torch control switches. The handle of the main control switch is then turned from its "off" position through its other successive positions and this will result first in simultaneously energizing all of the solenoid valves which control the supply of acetylene to the torches, namely, solenoid valves $V1^1$, $V2^1$, $V3^1$ and $V4^1$; then simultaneously energizing all of the solenoid valves which control the supply of preheating oxygen to the torches, namely, $V1^2$, $V2^2$, $V3^2$ and $V4^2$; and finally simultaneously energizing all of the solenoid valves which control the supply of cutting oxygen to the torches, namely, solenoid valves $V1^3$, $V2^3$, $V3^3$ and $V4^3$. Of course, instead of simultaneously starting all of the torches of the gang in this fashion, any selected group of the torches may be simultaneously started, by first closing all of the contacts of the torch control switches of the selected torches, and then manipulating the main control switch as just described. The gases will not, of course, be turned on at any torch whose corresponding torch control switch has not been previously actuated to close its contacts.

Whenever desired the gas supply to any torch can be turned off by moving the corresponding torch control switch to "off" position, and the gas supply to all of the torches can be turned off either by turning all of the torch control switches to "off" position or by turning the main control switch to "off" position.

If desired, the torch control switches may be constructed so that their three pairs of contacts are simultaneously closed and opened instead of being closed in succession as above described, but in this case the turning on of the gases in a predetermined sequence at any one torch can only be effected by actuating the main control switch through its successive positions after the contacts of the torch control switch of the selected torch have been closed. Moreover, in such a system it would not be possible to bring the torches into operation one at a time, and successively, without, upon bringing a torch into operation, throwing the previously started torch out of operation, because after the gases are turned on successively to one torch by turning the main control switch through its successive positions, the main control switch would have to be returned to the "off" position before it could be turned again through its successive positions to bring the next torch into operation.

Although the gas control system has been described as applied to a gang of cutting torches, it may also be used in connection with heating or welding torches, in which case there would be only two gas lines for the torches, one for acetylene, or other fuel-gas, and one for oxygen, and each torch would then have only two solenoid valves to control the supply of the two gases to the torch. Of course, the control system as illustrated could be used for only two gases, if desired, in which case the third gas line shown in Fig. 1 would be idle, and the third solenoid valve of each torch would remain idle by actuating the control switches through only the No. 1 and No. 2 positions.

I claim:

1. In a gas control system for torches, the combination with a gang of gas torches of a plurality of gas supply lines, a plurality of electro-magnetically actuated gas valves for each torch for controlling the supply of the gases from said lines to the torch, a control station, torch control switch means at the control station for each torch of the gang, each torch control switch means comprising a plurality of pairs of contacts and manually operable means for opening and closing the contacts, a main control switch at the control station comprising a plurality of pairs of contacts and manually operable means arranged in one position to cause all of the contacts to be open and in other successive positions to close the pairs of contacts successively, a current source to which one contact of each pair of contacts of the main control switch is electrically connected, a conductor leading from the second contact of each pair of contacts of the main control switch, each of said conductors being electrically connected to one contact of the corresponding pair of contacts of each torch control switch, the second contact of each pair of contacts of each torch control switch being electrially connected to one side of one of the electro-magnetic valve-actuating devices of the corresponding torch, and the other side of each electro-magnetic valve-actuating device being electrically connected to said current source whereby the gas valves of any torch may be operated in a predetermined sequence from the control station or a set of corresponding gas valves of all or any selected group of the torches may be operated from the control station simultaneously and in predetermined sequence with the other set or sets of corresponding gas valves.

2. In a gas control system for torches, the combination with a gang of gas torches of a plurality of gas supply lines, a plurality of electro-magnetically actuated gas valves for each torch for controlling the supply of the gases from said lines to the torch, a control station, a torch control switch at the control station for each torch of the gang, a main control switch at the control station, each of the switches comprising a plurality of pairs of electric contacts and manually operable means arranged in one position to cause all of the contacts to be open and in other successive positions to close the pairs of contacts successively, a current source to which one contact of each pair of contacts of the main control switch is electrically connected, a conductor leading from the second contact of each pair of contacts of the main control switch, each of said conductors being electrically connected to one contact of the corresponding pair of contacts of each torch control switch, the second contact of each pair of contacts of each torch control switch being electrically connected to one side of one of the electro-magnetic valve-actuating devices of the corresponding torch, and the other side of each electro-magnetic valve-actuating device being electrically connected to said current source whereby the gas valves of any torch may be operated in a predetermined sequence from the control station or a set of corresponding gas valves of all or any selected group of the torches may be operated from the control station simultaneously and in predetermined sequence with the other set or sets of corresponding gas valves.

3. In a gas control system for torches, the combination with a gang of gas torches of a supply line for fuel-gas and a supply line for oxygen, electro-magnetically actuated gas valves for each torch for controlling the supply of fuel-gas and oxygen from said lines to the torch, a control station, a torch control switch at the control station for each torch of the gang, a main control switch at the control station, each of the switches comprising a plurality of pairs of electric contacts and manually operable means arranged in one position to cause all of the contacts to be in open position and in other successive positions to close the pairs of contacts successively, a current source to which one contact of each pair of contacts of the main control switch is electrically connected, a conductor leading from the second contact of each pair of contacts of the main control switch, each of said conductors being electrically connected to one contact of the corresponding pair of contacts of each torch control switch, the second contact of the first-closed pair of contacts of each torch control switch being electrically connected to one side of the electro-magnetic device which actuates the fuel-gas valve of the corresponding torch and the second contact of a later-closed pair of contacts of each torch control switch being electrically connected to one side of the electro-magnetic device which actuates the oxygen valve of the corresponding torch, and the other side of each of said electro-magnetic devices being electrically connected to said current source whereby the fuel-gas and oxygen valves of any torch may be operated successively from the control station or simultaneous operation of the fuel-gas valves and simultaneous operation of the oxygen valves of all or any selected group of the torches may be effected in succession from the control station.

4. In a gas control system for torches, the combination with a gang of gas torches of a plurality of gas supply lines, a plurality of electro-magnetically actuated gas valves for each torch for controlling the supply of the gases from said lines to the torch, a control station, torch control switch means at the control station for each torch of the gang, each torch control switch means comprising a plurality of pairs of electric contacts and manually operable means for opening and closing the same, main control switch means at the control station comprising a plurality of pairs of electric contacts and manually operable means adapted in one position to cause all of the contacts to be open and in other successive positions to close the pairs of contacts successively, a current source to one side of which one contact of each pair of contacts of the main control switch means is electrically connected and to the other side of which one side of each of the electro-magnetic valve-actuating devices is electrically connected, and conductors electrically connecting each pair of contacts of the main control switch means in series with the corresponding pair of contacts of the torch control switch means and in series with one of said electro-magnetic valve-actuating devices whereby the gas valves of any torch may be operated in a predetermined sequence from the control station or a set of corresponding gas valves of all or any selected group of the torches may be operated from the control station simultaneously and in predetermined sequence with the other set or sets of corresponding gas valves.

5. In a gas control system for torches, the combination with a gang of gas torches of a plurality of gas supply lines, a plurality of electro-magnetically actuated gas valves for each torch for controlling the supply of the gases from said lines to the torch, a control station, torch control switch means at the control station for each torch of the gang, main control switch means at the control station, each of said switch means comprising a plurality of pairs of electric contacts and manually operable means adapted in one position to cause all of the contacts to be open and in other successive positions to close the pairs of contacts successively, a current source to one side of which one contact of each pair of contacts of the main control switch means is electrically connected and to the other side of which one side of each of the electro-magnetic valve-actuating devices is electrically connected, and conductors electrically connecting each pair of contacts of the main control switch means in series with the corresponding pair of contacts of the torch control switch means and in series with one of said electro-magnetic valve-actuating devices whereby the gas valves of any torch may be operated in a predetermined sequence from the control station or a set of corresponding gas valves of all or any selected group of the torches may be operated from the control station simultaneously and in predetermined sequence with the other set or sets of corresponding gas valves.

WALTER BEGEROW.

REFERENCES CITED

The following references are of record in the file of this patent:

UNITED STATES PATENTS

| Number | Name | Date |
|---|---|---|
| 1,763,113 | Wensley | June 10, 1930 |
| 1,846,620 | St. John | Feb. 23, 1932 |
| 1,879,940 | Mangiameli | Sept. 27, 1932 |
| 1,887,644 | Hyser | Nov. 15, 1932 |
| 2,278,532 | Crickmer | Apr. 7, 1942 |